United States Patent
Yeom et al.

(10) Patent No.: US 9,995,869 B2
(45) Date of Patent: Jun. 12, 2018

(54) BACKLIGHT UNIT AND DISPLAY DEVICE HAVING THE SAME

(71) Applicant: Samsung Display Co., Ltd., Yongin-si, Gyeonggi-Do (KR)

(72) Inventors: Dong-Yeol Yeom, Suwon-si (KR); Youngjun Choi, Asan-si (KR); Jinsook Bang, Ansan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days. days.

(21) Appl. No.: 14/737,669

(22) Filed: Jun. 12, 2015

(65) Prior Publication Data

US 2016/0109641 A1  Apr. 21, 2016

(30) Foreign Application Priority Data

Oct. 15, 2014  (KR) .......................... 10-2014-0139152

(51) Int. Cl.
*F21V 7/04*  (2006.01)
*F21V 8/00*  (2006.01)

(52) U.S. Cl.
CPC ......... *G02B 6/0055* (2013.01); *G02B 6/0041* (2013.01); *G02B 6/0065* (2013.01); *G02B 6/0088* (2013.01); *Y10S 977/774* (2013.01)

(58) Field of Classification Search
CPC .. G02B 6/0055; G02B 6/0041; G02B 6/0065; G02B 6/0088; F21K 9/56; B82Y 20/00; Y10S 977/774
USPC ........................................ 362/606, 97.1–97.4
See application file for complete search history.

(56) References Cited

U.S. PATENT DOCUMENTS

| | | | |
|---|---|---|---|
| 2009/0080215 A1* | 3/2009 | Anandan ............. | G02B 6/0036 362/606 |
| 2010/0302803 A1* | 12/2010 | Bita .................... | G02B 6/0036 362/606 |
| 2012/0176813 A1* | 7/2012 | Holten ................ | G02B 6/0018 362/606 |
| 2013/0070482 A1* | 3/2013 | Miyazaki ............ | G02B 6/0055 362/624 |

(Continued)

FOREIGN PATENT DOCUMENTS

| JP | 2008-078145 A | 4/2008 |
|---|---|---|
| JP | 2012-028328 A | 2/2012 |

(Continued)

*Primary Examiner* — Elmito Breval
*Assistant Examiner* — Jessica M Apenteng
(74) *Attorney, Agent, or Firm* — H.C. Park & Associates, PLC (57) ABSTRACT

A backlight unit includes a light conversion member; a light guide plate including a light exit surface, a rear surface facing the light exiting surface, and connection surfaces including a first surface and a second surface facing each other to connect the light exit surface and the rear surface; a reflective member; and a light source emitting a first color light incident to the first surface and a portion of the first color light reaches the second surface on which the reflective member is disposed to specularly reflect the portion of the first color light. The light conversion member is disposed on the light exit surface, receives the first color light from the light guide plate, and emits a second color light different from the first color light.

18 Claims, 10 Drawing Sheets

(56) References Cited

U.S. PATENT DOCUMENTS

| | | | | |
|---|---|---|---|---|
| 2013/0250610 A1* | 9/2013 | Brick | ............... | G02B 6/0041 362/607 |
| 2013/0335677 A1* | 12/2013 | You | ............... | G02F 1/133609 349/65 |
| 2014/0056024 A1* | 2/2014 | Kim | ............... | G02B 6/003 362/608 |
| 2015/0355399 A1* | 12/2015 | You | ............... | G02B 6/005 349/65 |

FOREIGN PATENT DOCUMENTS

| KR | 10-2012-0061539 A | 6/2012 |
|---|---|---|
| KR | 10-2012-0067550 A | 6/2012 |
| KR | 10-2013-0026893 A | 3/2013 |
| KR | 10-2013-0125506 A | 11/2013 |
| KR | 10-2015-0092797 A | 8/2015 |

\* cited by examiner

BACKLIGHT UNIT AND DISPLAY DEVICE HAVING THE SAME

CLAIM OF PRIORITY

This U.S. non-provisional patent application claims the priority and all the benefits accruing under 35 U.S.C. § 119 of Korean Patent Application No. 10-2014-0139152, filed on Oct. 15, 2014 in Korean Intellectual Property Office ("KIPO"), the contents of which are hereby incorporated by reference in its entirety.

BACKGROUND OF THE INVENTION

1. Field of Disclosure

The present disclosure relates to a backlight unit and a display device having the same. More particularly, the present disclosure relates to a backlight unit having improved color reproducibility and a display device having the backlight unit.

2. Description of the Related Art

A display panel of a non-self-emissive display device, e.g., a liquid crystal display device, does not emit light by self-emission. The non-self-emissive display device displays an image using the light provided from a backlight unit. The backlight unit includes a light source and a light guide plate converting the light emitted from the light source into a surface light source.

The light guide plate guides and diffuses the light incident thereto through one side portion thereof and provides the diffused light to an entire surface of the display panel. The light incident to the light guide plate travels through the light guide plate, and then exits through a front surface of the light guide plate, which faces the display panel.

SUMMARY OF THE INVENTION

The present disclosure provides a backlight unit capable of providing a light with uniform brightness to an entire display area.

The present disclosure provides a display device capable of preventing a light leakage phenomenon from occurring and having improved color reproducibility.

Embodiments of the inventive concept provide a backlight unit including a light source emitting a first color light, a light guide plate including a light exit surface, a rear surface facing the light exiting surface, and connection surfaces, a reflective member, and a light conversion member. The connection surfaces include first and second surfaces facing each other to connect the light exit surface and the rear surface, the first surface faces the light source to receive the first color light, and the first color light exits through the light exit surface. The reflective member is disposed on the second surface to specularly reflect a light corresponding to a portion of the first color light, which is incident to the first surface and reaches the second surface. The light conversion member is disposed on the light exit surface, receives the first color light from the light guide plate, and emits a second color light different from the first color light.

A light incident to the reflective member has substantially a same wavelength as a wavelength of a light reflected by the reflective member.

The reflective member includes a polymer material or a metal material.

The second color light is a white light and the first color light is a blue light.

The light conversion member includes a quantum dot.

The backlight unit further includes an adhesive member disposed on the second surface to couple the light guide plate and the reflective member.

The adhesive member has a refractive index substantially equal to a refractive index of the light guide plate.

The backlight unit further includes a plurality of sub-reflective members. The connection surfaces further include third and fourth surfaces facing each other to connect the first and second surfaces, the sub-reflective members are respectively disposed on the third and fourth surfaces, and the sub-reflective members specularly reflect lights respectively reaching the third and fourth surfaces.

The light guide plate further includes reflective patterns disposed on the rear surface facing the light exit surface and the reflective patterns reflect a light reaching the rear surface.

Embodiments of the inventive concept provide a display device including a receiving unit, a display panel accommodated in the receiving unit, and a backlight unit accommodated in the receiving unit and disposed under the display panel to supply a first color light to the display panel. The backlight unit includes a light source emitting a second color light different from a first color light, a light guide plate including a light incident surface facing the light source to receive the second color light and a light exit surface bent from the light incident surface to face the display panel and emitting the second color light to the display panel, a reflective member disposed on a light facing surface facing the light incident surface to specularly reflect a light corresponding to a portion of the second color light, and a light conversion member disposed between the light guide plate and the display panel and receiving the second color light exiting through the light exit surface to supply the first color light to the display panel.

The light conversion member includes a quantum dot.

The first color light is a white light.

The display device further includes an optical member accommodated in the receiving unit and disposed between the light conversion member and the display panel.

The reflective member includes a polymer material or silver.

The reflective member covers an entire surface of the light facing surface.

According to the above, the backlight unit includes the reflective member disposed on the light facing surface of the light guide plate. The reflective member specularly reflects the light of the light incident to the light guide plate, which reaches the light facing surface. Therefore, the light having uniform wavelength exits through the front surface and the edge of the backlight unit without changing the wavelength of the light. In addition, the light leakage is prevented from occurring at the edge of the backlight unit, and thus the light having uniform brightness is provided to the display panel.

The display device including the backlight unit has improved color reproducibility. In addition, since the display device prevents brightness from lowering or defects in color in a bezel area, a stable display quality of the display device is maintained even though the bezel area is reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunc

DETAILED DESCRIPTION OF THE INVENTION

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
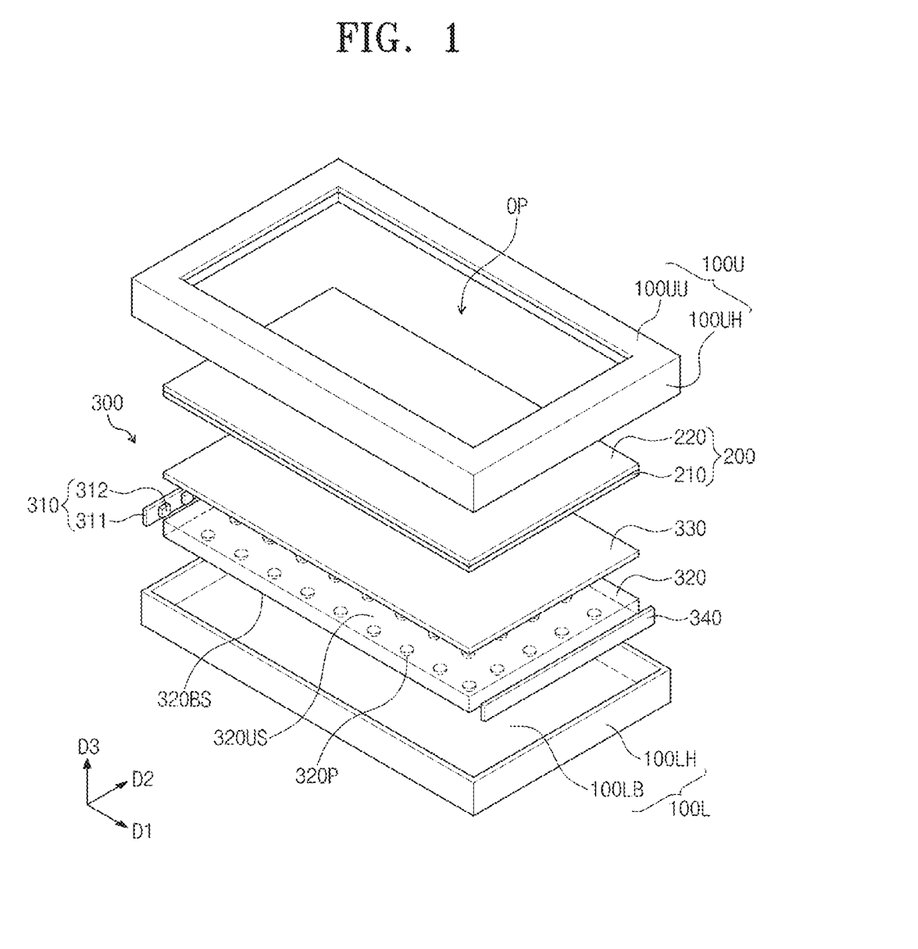
- FIG. 1 is an exploded perspective view showing a display device according to an exemplary embodiment of the present disclosure.
Figure 2:
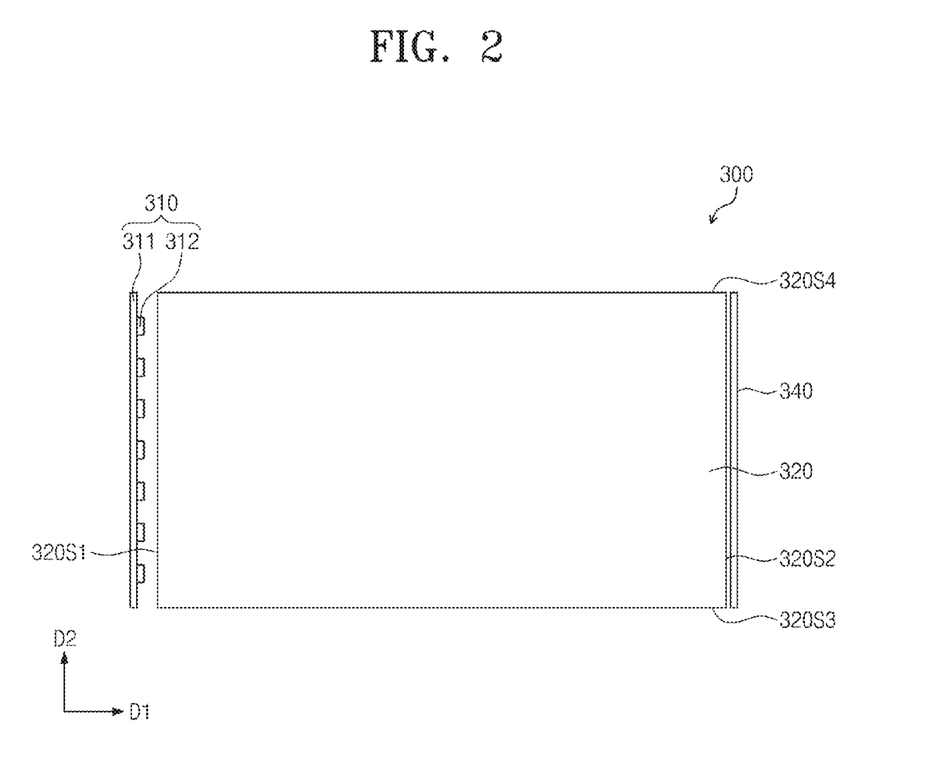
FIG. 2 is a plan view showing a portion of the display device shown in FIG. 1.

FIG. 1 is an exploded perspective view showing a display device according to an exemplary embodiment of the present disclosure and FIG. 2 is a plan view showing a portion of the display device shown in FIG. 1.

Referring to FIGS. 1 and 2, the display device includes a receiving unit 100U and 100L, a display panel 200, and a backlight unit 300.

The receiving unit 100U and 100L defines an inner space to accommodate the display panel 200 and the backlight unit 300. The receiving unit 100U and 100L includes an upper cover 100U and a lower cover 100L coupled with the upper cover 100U. The inner space is provided by coupling the upper cover 100U and the lower cover 100L.

The upper cover 100U includes an upper portion 100UU and a side portion 100UH. The upper portion 100UU is substantially parallel to a plane surface defined by a first direction D1 and a second direction D2 crossing the first direction D1. The upper portion 100UU may have a frame shape through which a predetermined opening OP is formed.

The side portion 100UH is bent from the upper portion 100UU to a third direction D3 crossing the first and second directions D1 and D2. The side portion 100UH is bent from four sides of the upper portion 100UU.

The lower cover 100L includes a bottom portion 100LB and a side portion 100LH. The bottom portion 100LB is substantially parallel to the upper portion 100UU. The bottom portion 100LB has substantially a rectangular shape. The side portion 100LH is bent from four sides of the bottom portion 100LB to the third direction D3.

The display panel 200 is disposed between the upper cover 100U and the lower cover 100L. The display panel 200 is partially covered by the upper portion 100UU.

The display panel 200 displays an image in response to electrical signals. The display panel 200 may be a transmissive or transflective type display panel, such as a liquid crystal display panel, an electrophoretic display panel, an electrowetting display panel, etc.

In the present exemplary embodiment, the liquid crystal display panel will be described as the display panel 200. The display panel 200 includes a first substrate 210, a second substrate 220 facing the first substrate 210, and a liquid crystal layer (not shown) interposed between the first and second substrates 210 and 220.

The display panel 200 includes a display area and a non-display area surrounding the display area. The display area is an area in which the image is displayed and the non-display area is an area in which the image is not displayed. The display area is perceived by a user through the opening OP and the non-display area is covered by the upper portion 100UU.

The backlight unit 300 is disposed between the display panel 200 and the lower cover 100L. The backlight unit 300 provides a light to the display panel 200. The backlight unit 300 includes a light source 310, a light guide plate 320, a light conversion member 330, and a reflective member 340. For the convenience of explanation, the light conversion member 330 is not shown in FIG. 2. Hereinafter, the backlight unit 300 will be described in detail with reference to FIGS. 1 and 2.

The light source 310 includes a circuit board 311 and a plurality of light emitting units 312, but it should not be limited thereto or thereby. According to embodiments, the light source 310 may include one light emitting unit having the same size as that of the circuit board 311.

The circuit board 311 applies electrical signals to the light emitting units 312. Although not shown in figures, the circuit board 311 includes wires to apply the electrical signals to the light emitting units 312.

The light emitting units 312 are arranged on the circuit board 311 in a direction. The light emitting units 312 generate a light having a first color. The light is emitted from a light exit surface of each of the light emitting units 312. In the present exemplary embodiment, each of the light emitting units 312 includes one or more light emitting diodes.

In the present exemplary embodiment, the first color may be, but not limited to, a blue light. That is, the light emitting units 312 are configured to include light emitting diodes to generate the light having a wavelength of about 430 nm to about 480 nm, but the light emitted from the light emitting units 312 should not be limited to the blue light.

The light guide plate 320 is disposed under the display panel 200. The light guide plate 320 receives the light from the light source 310 and provides the light to the display panel 200.

The light guide plate 320 uniformly provides the light to an entire surface of the display panel 200. The light guide plate 320 has a substantially rectangular shape to overlap the display panel 200.

The light guide plate 320 includes a front surface 320US, a rear surface 320BS, and a plurality of connection surfaces 320S1 to 320S4. The front surface 320US faces the display panel 200 and the rear surfaces 320BS faces the bottom portion 100LB.

The front surface 320US serves as a light exit surface from which the light exits toward the display panel 200. The light provided from the light source 310 exits to the upper side through the front surface 320US.

A plurality of light guide patterns 320P is disposed on the rear surface 320BS. The light guide patterns 320P improve reflectance of the rear surface 320BS such that the light traveling through the light guide plate 320 is reflected by the rear surface 320BS and re-incident to the inside of the light guide plate 320.

The light guide patterns 320P are protruded downward from the rear surface 320BS. The light guide patterns 320P may have various shapes, e.g., a dome shape, a conical shape, a poly-pyramid shape, a cylindrical shape, a polygonal cylindrical shape, etc. However, according to embodiments, the light guide patterns 320P may be recessed from the rear surface 320BS to the inside of the light guide plate 320. In addition, the light guide patterns 320P may be omitted.

The connection surfaces 320S1 to 320S4 are configured to include the connection surfaces 320S1 and 320S2 facing each other in the first direction D1 and extending in the second direction D2 and the connection surfaces 320S3 and 320S4 facing each other in the second direction D2 and extending in the first direction D1.

The light source 310 is disposed on one connection surface 320S1 among the connection surfaces 320S1 to 320S4. The connection surface 320S1 serves as the light incident surface. The light emitted from the light source 310 is incident to the light guide plate 320 through the light incident surface 320S1.

The light incident to the light guide plate 320 travels through the inside of the light guide plate 320 and exits to the outside of the light guide plate 320 through the front surface 320US.

Among the connection surfaces 320S1 to 320S4, the reflective member 340 is disposed on the connection surface 320S2 facing the light incident surface 320S1. The connection surface 320S2 is referred to as a light facing surface. A portion of the light incident to the light guide plate 320 reaches the light facing surface 320S2. The light incident to the light guide plate 320 will be described in detail later.

The light conversion member 330 is disposed between the light guide plate 320 and the display panel 200, i.e., on an optical path through which the light travels. For instance, the light conversion member 330 is disposed on the front surface 320US of the light guide plate 320 as shown in FIG. 1.

The light conversion member 330 converts the wavelength of the light incident thereto. In the present exemplary embodiment, the light conversion member 330 converts the wavelength of the light incident thereto and provides the converted light to the display panel 200.

The light conversion member 330 receives the light having the first color from the light guide plate 320. The light conversion member 330 converts the wavelength of the light having the first color and emits a light having a second color different from the first color.

The light conversion member 330 converts the wavelength of a portion of the incident light. For instance, the light conversion member 330 converts the blue light to a green or red light.

The light conversion member 330 converts the portion of the incident light to the green light having a wavelength of about 520 nm and about 560 nm and converts the other portion of the incident light to the red light having a wavelength of about 630 nm to about 660 nm.

The blue light passing through the light conversion member 330 without being converted by the light conversion member 330, the green light generated by the light conversion member 330, and the red light generated by the light conversion member 330 are mixed with each other to form a white light. Accordingly, the second color light exiting from the light conversion member 330 and traveling to the display panel 200 may be the white light. In other words, the light conversion member 330 may convert the blue light to the white light.

The light conversion member 330 may have a sheet shape or a plate shape. The light conversion member 330 covers the light guide plate 320 and the reflective member 340 when viewed in a plan view.

The light conversion member 330 may include various materials to convert the wavelength of the light incident thereto. For instance, the light conversion member 330 may be, but not limited to, a quantum dot-enhanced display including a plurality of quantum dots.

The quantum dots are semiconductor particles each having a diameter of nanometer size and have photoluminescence characteristics. Each quantum dot has an inherent band gap and emits a light having a wavelength corresponding to the band gap when an electron in an excited state drops to a stable state. The band gap of each quantum dot is inversely proportional to the size thereof. Therefore, when the size of the quantum dots is controlled, the light having desired wavelength may be generated.

The quantum dots are distributed in the quantum dot-enhanced display. As described above, when a mixture ratio of the quantum dots having different sizes is controlled, the wavelength of the light emitted from the quantum dot-enhanced display is changed. In the present exemplary embodiment, the quantum dot-enhanced display may be formed to allow the white light to be provided to the display panel 200.

The reflective member 340 is disposed adjacent to one side of the light guide plate 320. The reflective member 340 is disposed to face the light source 310 such that the light guide plate 320 is disposed between the reflective member 340 and the light source 310.

In the present exemplary embodiment, the reflective member 340 is disposed on the light facing surface 320S2. The reflective member 340 is disposed adjacent to the light facing surface 320S2 or disposed to make contact with the light facing surface 320S2.

The reflective member 340 reflects the portion of the light incident to the light guide plate 320, which reaches the light facing surface 320S2. The light reaching the light facing surface 320S2 is reflected by the reflective member 340 to be redirected to the inside of the light guide plate 320 to exit through the front surface 320US.

The reflection of the light due to the reflective member 340 may be a regular reflection. The regular reflection means that an incident angle of a light incident to a predetermined light incident surface is substantially equal to a reflection angle of the light incident to the light incident surface, and thus the incident light, the reflected light, and a normal line of the light incident position are located on the same plane surface.

Accordingly, the light incident to the reflective member 340 is specularly reflected. The wavelength of the light incident to the reflective member 340 is substantially equal to the wavelength of the light reflected by the reflective member 340.

The reflective member 340 includes a polymer material that forms a surface to cause the regular reflection. The reflective member 340 may be, but not limited to, an optical film having a single-layer structure or a multi-layer structure. For instance, the reflective member 340 may be an enhanced specular reflector (ESR) film.

According to another embodiment, the reflective member 340 may include a metal material. The metal material may be a white metal material having a high reflectance to cause the regular reflection. For instance, the reflective member 340 may include silver (Ag), platinum (Pt), or aluminum (Al).

In addition, the reflective member 340 may further include a reflective layer (not shown) partially coated on a surface thereof facing the light facing surface 320S2. The reflective member 340 may include various materials to cause the regular reflection of the light incident to the reflective member 340. The light conversion of the backlight unit 300 will be described in detail later.

Figure 3A:
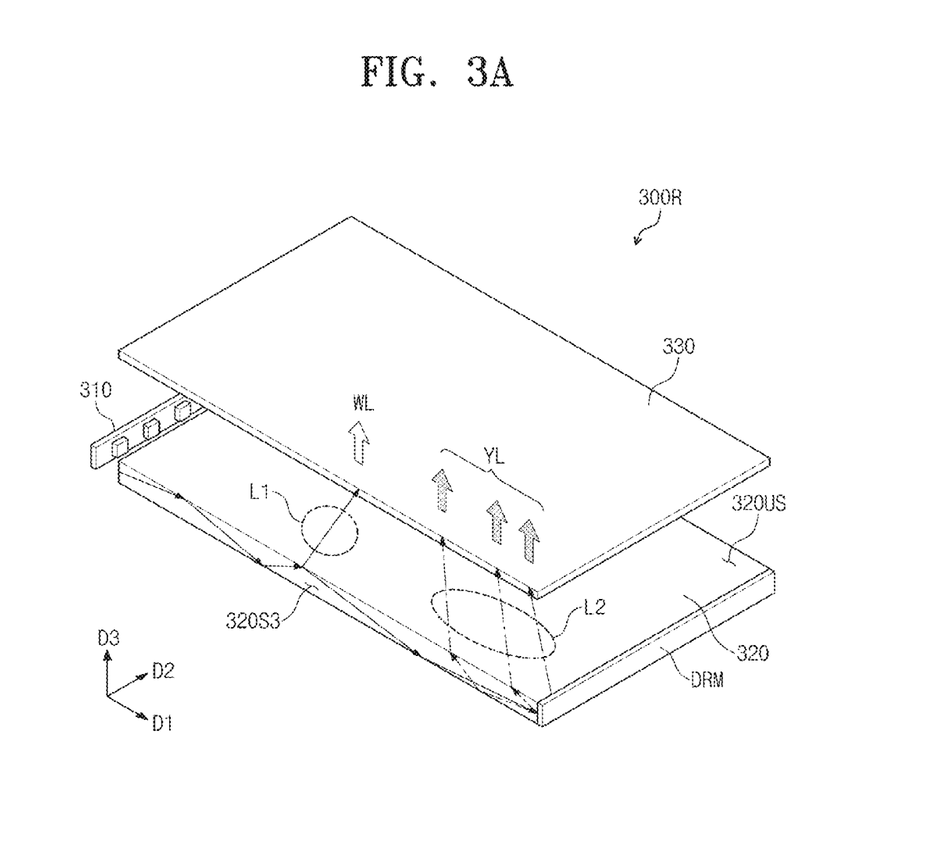
FIG. 3A is cross-sectional view showing a backlight unit according to a comparison example.
Figure 3B:
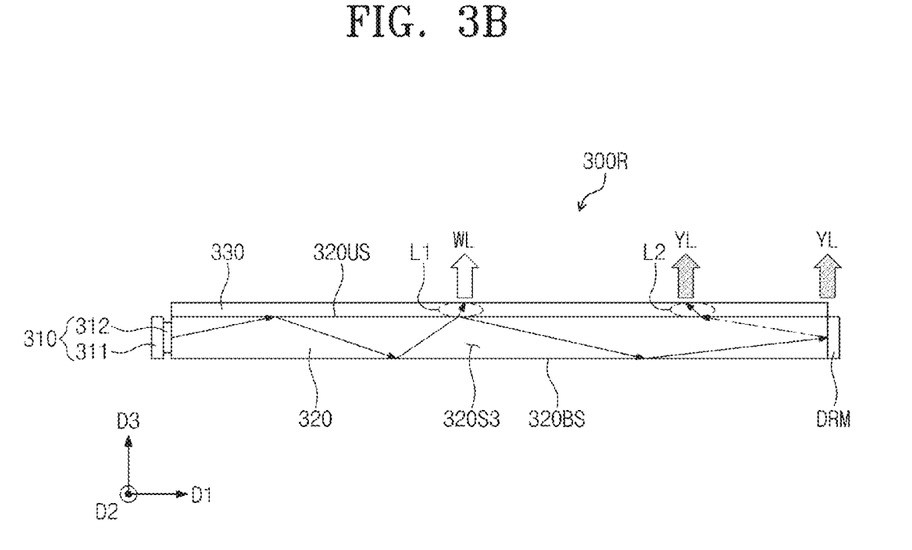
FIG. 3B is a cross-sectional view showing the backlight unit shown in FIG. 3A.
Figure 3C:
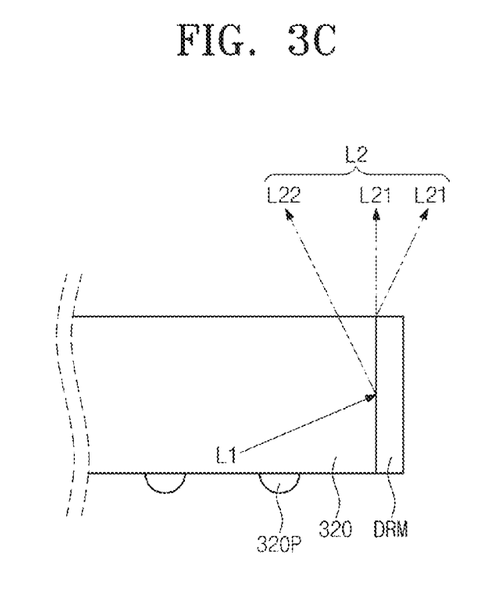
FIG. 3C is a cross-sectional view showing a portion of the backlight unit shown in FIG. 3B.
Figure 4A:
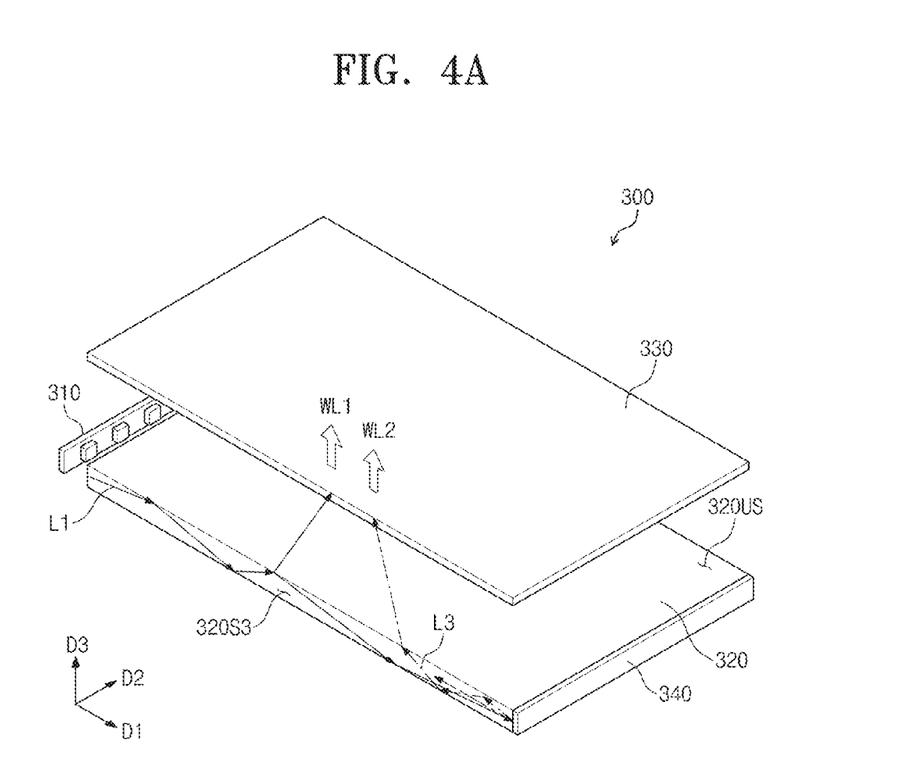
FIG. 4A is cross-sectional view showing a backlight unit according to an exemplary embodiment of the present disclosure.
Figure 4B:
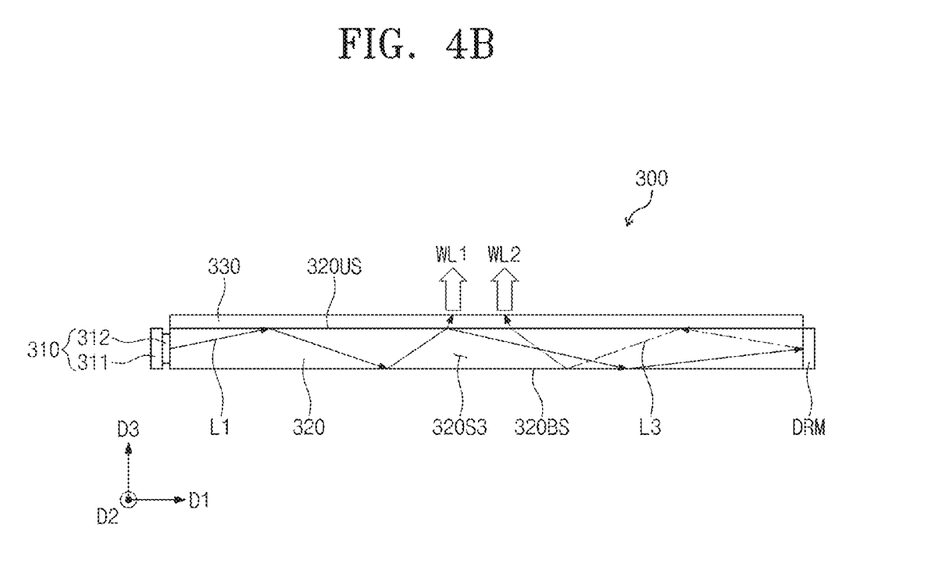
FIG. 4B is a cross-sectional view showing the backlight unit shown in FIG. 4A
Figure 4C:
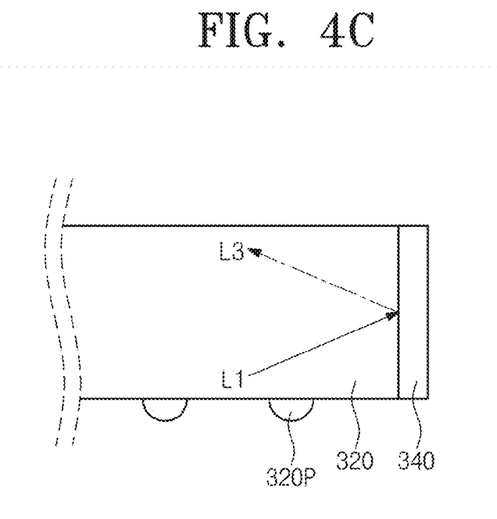
FIG. 4C is a cross-sectional view showing a portion of the backlight unit shown in FIG. 4B.
Figure 4D:
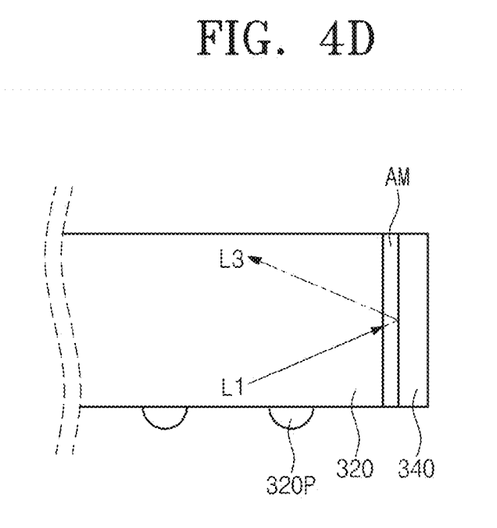
FIG. 4D is a cross-sectional view showing a portion of a backlight unit according to an exemplary embodiment of the present disclosure.

FIG. 3A is cross-sectional view showing a backlight unit according to a comparison example, FIG. 3B is a cross-sectional view showing the backlight unit shown in FIG. 3A, FIG. 3C is a cross-sectional view showing a portion of the backlight unit shown in FIG. 3B, FIG. 4A is perspective cross-sectional view showing a backlight unit according to an exemplary embodiment of the present disclosure, FIG. 4B is a cross-sectional view showing the backlight unit shown in FIG. 4A, FIG. 4C is a cross-sectional view showing a portion of the backlight unit shown in FIG. 4B, and FIG. 4D is a cross-sectional view showing a portion of a backlight unit according to an exemplary embodiment of the present disclosure. For the convenience of explanation, the optical path of the light is simply shown in FIGS. 3A, 3B, 3C and 4A to 4D. Hereinafter, the backlight unit 300 will be described in detail with reference to FIGS. 3A, 3B, 3C, and 4A to 4D.

Meanwhile, elements shown in FIG. 3A are substantially the same as elements shown in FIG. 4A except for the reflective member 340 shown in FIG. 4A. In addition, the elements shown in FIG. 4A are substantially the same as those described with reference to FIGS. 1 and 2. In FIGS. 3A, 3B, 3C, and 4A to 4D, the same reference numerals denote the same elements in FIGS. 1 and 2, and thus detailed descriptions of the same elements will be omitted.

Referring to FIGS. 3A, 3B, and 3C, the backlight unit 300R according to the comparison example includes a light source 310, a light guide plate 320, a light conversion member 330, and a diffusion member DRM. The diffusion reflection member DRM is disposed at the light facing surface 320S2 of the light guide plate 320.

A light L1 (hereinafter, referred to as an incident light) incident to the light incident surface 320S1 from the light source 310 travels through the inside of the light guide plate 320. The incident light L1 exits through the front surface 320US or is reflected by the rear surface 320BS to travel through the inside of the light guide plate 320.

The incident light L1 traveling through the inside of the light guide plate 320 reaches the light facing surface 320S2 farthest away from the light incident surface 320S1. The light reaching the light facing surface 320S2 is incident to the diffusion reflection member DRM.

The diffusion reflection member DRM reflects the light reaching the light facing surface 320S2 such that the light reaching the light facing surface 320S2 travels to the front surface 320US. In this case, the diffusion reflection member DRM diffusively reflects the light incident to the diffusion reflection member DRM.

The diffusion reflection means that an incident light incident to a predetermined light incident surface is reflected to all directions. The diffusion reflection converts the wavelength of the incident light. Accordingly, a wavelength of the incident light L1 incident to the diffusion reflection member DRM is substantially different from a wavelength of a light L2 (hereinafter, referred to as a diffusion reflection light) reflected by the diffusion reflection member DRM. In the present exemplary embodiment, the diffusion reflection light L2 may be a white light obtained by mixing lights having various colors.

In addition, the incident light is scattered/reflected by the diffusion reflection. Therefore, the diffusion reflection member DRM irregularly changes the optical path of the light incident thereto. An incident angle of the incident light L1 incident to the diffusion reflection member DRM is substantially different from an angle of the diffusion reflection light L2 reflected by the diffusion reflection member DRM.

As shown in FIGS. 3B and 3C, the diffusion reflection light L2 includes a first reflection light L21 and a second reflection light L22. The first reflection light L21 and the second reflection light L22 have the same wavelength and different reflection angles.

The first reflection light L21 travels along the path between the diffusion reflection member DRM and the light guide plate 320. A portion of the first reflection light L21 may be incident to the light conversion member 330, but a portion of the first reflection light L21 may appear as a light leakage without being incident to the light conversion member 330.

The second reflection light L22 is reflected by the diffusion reflection member DRM and redirected back into the light guide plate 320. The second reflection light L22 travels along the inside of the light guide plate 320 and exits through the front surface 320US of the light guide plate 320.

Referring to FIGS. 3A, 3B, and 3C again, the light exiting through the front surface 320US of the light guide plate 320 includes the incident light L1 and the diffusion reflection light L2. Each of the incident light L1 and the diffusion reflection light L2 is incident to the light conversion member 330 and converted to have different wavelength.

As described above, the light conversion member 330 converts the wavelength of the light incident thereto and generates the light having the different color. In this case, when the wavelength of the light incident to the light conversion member 330 is changed, the light conversion member 330 converts the light to light having a different wavelength.

In the comparison embodiment, the light conversion member 330 generates a first light WL and a second light YL with respect to the incident light L1 and the diffusion reflection light L2, which have different wavelengths, and provides the first and second lights WL and YL to the display panel. Thus, the light provided to the display panel from the backlight unit 300R according to the comparison example is not uniform For instance, when the incident light L1 is blue light, the light conversion member 330 generates the first light WL having a white color. In addition, when the diffusion reflection light L2 is white light, the light conversion member 330 generates the second light YL having a yellow color.

Referring to FIGS. 4A, 4B, and 4C, the backlight unit 300 according to the present disclosure includes the reflective member 340 instead of the diffusion reflection member DRM. The portion of the incident light L1, which travels through the inside of the light guide plate 320, reaches the light facing surface 320S2. The light reaching the light facing surface 320S2 is reflected by the reflective member 340.

In this case, the reflective member 340 specularly reflects the light reaching the light facing surface 320S2. The reflection light L3 (hereinafter, referred to as a regular reflection light) reflected by the reflective member 340 is specularly reflected by the reflective member 340.

The regular reflection maintains the wavelength of the light and changes only the optical path of the light. Thus, the wavelength of the incident light L1 incident to the reflective member 340 is substantially equal to the wavelength of the regular reflection light L3 reflected by the reflective member 340. That is, when the incident light L1 is the blue light, the regular reflection light L3 may be the same blue light as the incident light L1 except that the optical path of the regular reflection light L3 is different from the optical path of the incident light L1.

In addition, the regular reflection reflects the light at the angle that is the same as the incident angle of the incident light. The incident angle of the incident light L1 incident to the reflective member 340 is substantially equal to the angle of the regular reflection light L3 reflected by the reflective member 340.

Accordingly, light travels between the reflective member 340 and the light guide plate 320. Also, by including the reflective member 340 in the backlight unit 310, light leakage may be reduced.

The reflective member 340 has a height equal to or greater than a thickness of the light guide plate 320, i.e., a height of the light facing surface 320S2. When the height of the reflective member 340 is greater than the height of the light facing surface 320S2, the light leakage may be more effectively blocked by the reflective member 340.

Referring to FIG. 4D, the backlight unit 300 may further include an adhesive member AM. The adhesive member AM is disposed on the light facing surface 320S2. The adhesive member AM couples the reflective member 340 to the light guide plate 320.

The adhesive member AM is formed of a polymer material having adhesive force. The adhesive member AM is optically colorless and transparent. The adhesive member AM may include a reattachable adhesive or a pressure-sensitive adhesive and include a thermal or photo-curable material.

The adhesive member AM may be a pressure sensitive adhesive in liquid state or a double-sided adhesive tape, but the adhesive member AM should not be limited thereto or thereby as long as the light guide plate 320 and the reflective member 340 are stably coupled to each other by the adhesive member AM.

The adhesive member AM may have substantially the same refractive index as that of the light guide plate 320. Therefore, although the incident light L1 passes through the adhesive member AM, a variation in the optical path of the incident light L1 is small. The adhesive member AM allows the reflective member 340 to be stably placed on the light facing surface 320S2.

Referring to FIGS. 4A to 4D, the light exiting from the front surface 320US of the light guide plate 320 includes the incident light L1 and the regular reflection light L3. The light conversion member 330 generates a first conversion light WL1 obtained by converting the wavelength of the incident light L1 and a second conversion light WL2 obtained by converting the wavelength of the regular reflection light L3.

As described above, the wavelength of the converted light is changed according to the wavelength of the incident light by the light conversion member 330. Accordingly, the wavelength of the first conversion light WL1 is substantially equal to the wavelength of the second conversion light WL2. In the present exemplary embodiment, the light conversion member 330 receives the incident light L1 and the regular reflection light L3, each having the blue color, and generates the first and second conversion lights WL1 and WL2, each having the white color.

Therefore, the backlight unit 300 provides the light having the uniform color to the entire surface of the display panel 200. As described above, since the display device includes the above-mentioned backlight unit, the display device may improve a color purity and a color reproducibility thereof.

Figure 5:
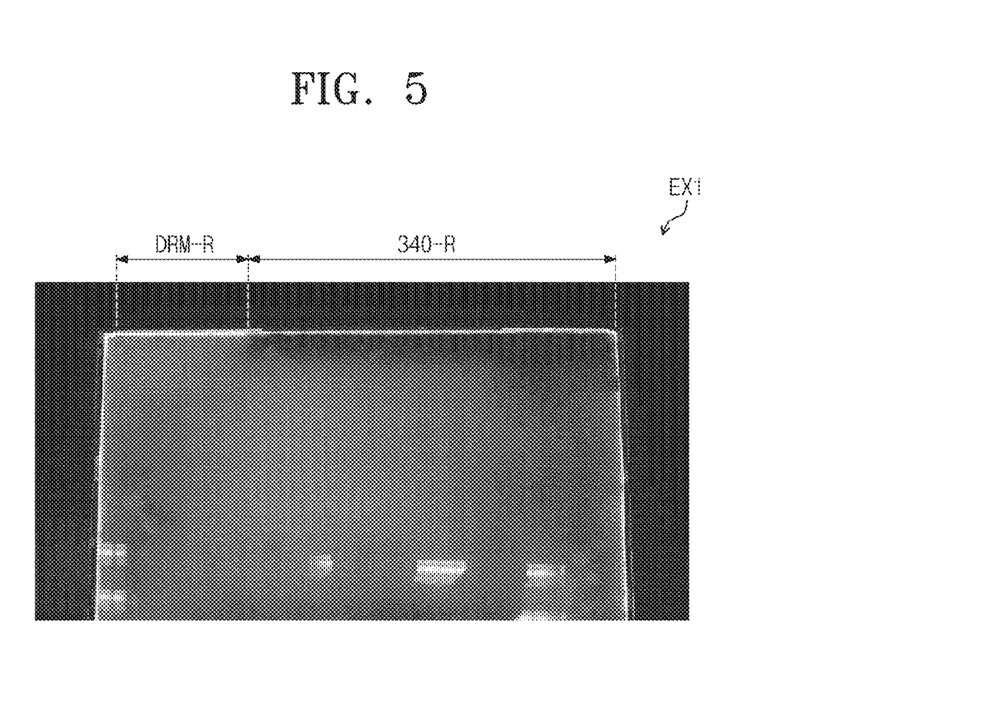
FIG. 5 is an SEM image showing a portion of a backlight unit according to an exemplary embodiment of the present disclosure.

FIG. 5 is an SEM image showing a portion of a backlight unit according to an exemplary embodiment of the present disclosure. FIG. 5 shows an embodiment EX1 in which different members are disposed on the light facing surface of the light guide plate. In FIG. 5, the same reference numbers denote the same elements in FIGS. 1 to 4B, and thus detailed descriptions of the same elements will be omitted.

The embodiment EX1 includes a lower cover 100L, a light guide plate 320, and a light source (not shown). The light facing surface 320S2 of the light guide plate 320 includes a first region DRM-R and a second region 340-R.

The diffusion reflection member DRM (refer to FIG. 3A) is disposed in the first region DRM-R and the reflective member 340 (refer to FIG. 4A) is disposed in the second region 340-R. As described above, when the light source emits light to the light incident surface (not shown) of the light guide plate 320 in response to the electrical signals, the light travels through the inside of the light guide plate 320, the portion of the light directly exits through the front surface 320US of the light guide plate 320, and the other portion of the light reaches the light facing surface 320S2.

The wavelength of the light, which is incident to the light guide plate 320 and directly exits through the front surface 320US, is not changed. Accordingly, the light exiting through the front surface 320US has the same color as that of the light emitted from the light source. In the present exemplary embodiment, since the light source emits the blue light, the light exiting through the front surface 320US has the blue color.

The light reaching the light facing surface 320S2 exits through the front surface 320US after being reflected by the members disposed on the light facing surface 320S2. In this case, the light incident to the diffusion reflection member DRM is diffusively reflected and the light incident to the reflective member 340 is specularly reflected. Therefore, the light exiting through areas adjacent to the light facing surface 320S2 has different colors depending on the regions DRM-R and 340-R.

In the present exemplary embodiment, the diffusion reflection member DRM includes a fluorescent substance. For instance, the fluorescent substance is coated on the surface of the diffusion reflection member DRM. The blue light incident to the diffusion reflection member DRM interacts with the fluorescent substance coated on the surface of the diffusion reflection member DRM, and then is reflected as white light.

Thus, the light exiting through the area adjacent to the first region DRM-R has a white color. The diffusion reflection member DRM diffusively reflects the light incident thereto to generate lights having various wavelengths. Accordingly, the light reflected by the diffusion reflection member DRM has a white color obtained by mixing the lights having various wavelengths with each other.

The light exiting through the area adjacent to the second region 340-R has a blue color. The reflective member 340 specularly reflects the light incident thereto and generates light having the same wavelength as that of the light incident thereto. Therefore, the light reflected by the reflective member 340 has the same blue color and wavelength as that of the light emitted from the light source.

Referring to FIG. 5, when the light exiting through the area adjacent to the first region DRM-R is compared with the light exiting through the area adjacent to the second region 340-R, an amount of the white light exiting through the area adjacent to the first region DRM-R is greater than an amount of the white light exiting through the area adjacent to the second region 340-R. Since the light incident to the diffusion reflection member DRM is scattered/reflected by the diffusion reflection member DRM, the light leakage in the first region DRM-R is relatively large compared with the light leakage in the second region 340-R.

Figure 6:
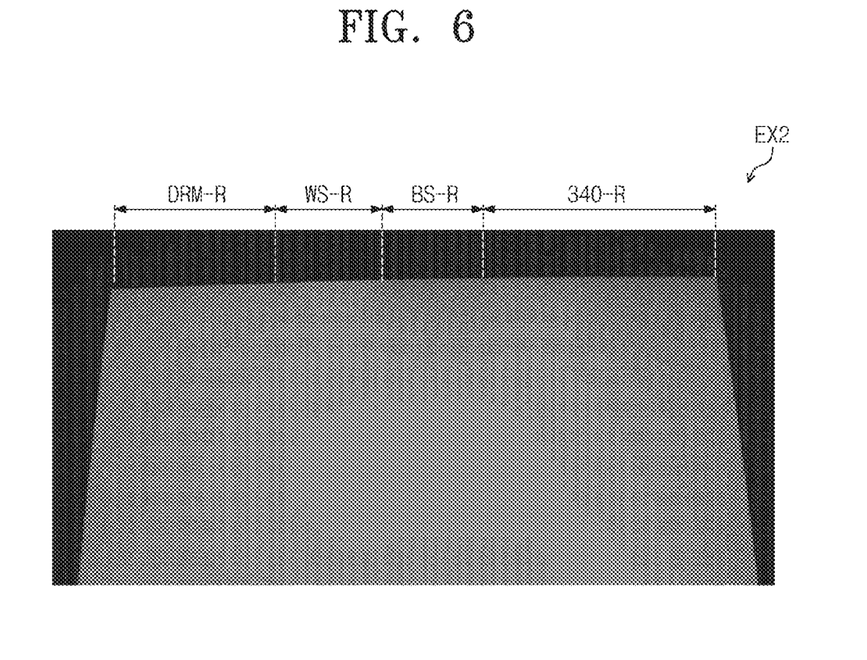
FIG. 6 is an SEM image showing a portion of a backlight unit according to an exemplary embodiment of the present disclosure.

FIG. 6 is an SEM image showing a portion of a backlight unit according to an exemplary embodiment of the present disclosure. FIG. 6 shows an embodiment EX2 in which different members are disposed on the light facing surface of the light guide plate. In FIG. 6, the same reference numbers denote the same elements in FIGS. 1 to 5, and thus detailed descriptions of the same elements will be omitted.

The embodiment EX2 includes a light source (not shown), a light guide plate (not shown), a light conversion member 330, and a plurality of members (not shown) disposed on the light facing surface of the light guide plate. The light source, the light guide plate, and the members are covered by the light conversion member 330. The light conversion member 330 converts the wavelength of the light exiting through the front surface of the light guide plate. The light source emits the blue light and the light conversion member 330 emits the white light.

The members are arranged along the light facing surface. The embodiment EX2 includes four regions, e.g., first, second, third, and fourth regions DRM-R, WS-R, BS-R, and 340-R.

The first region DRM-R includes the diffusion reflection member DRM (refer to FIG. 3A) disposed therein and the second region WS-R includes a white reflective member (not shown) disposed therein. The third region BS-R includes a black reflective member (not shown) disposed therein and the fourth region 340-R includes the reflective member 340 (refer to FIG. 4A) disposed therein. The light exiting through areas adjacent to the light facing surface has different colors depending on the areas.

Referring to FIG. 6, the light exiting through an area adjacent to the first region DRM-R has a relatively yellow color. The blue light is converted to the white light while being reflected by the diffusion reflection member DRM. The light reflected by the diffusion reflection member DRM is redirected towards the light conversion member 330.

The light conversion member 330 converts the white light to the yellow light. Accordingly, a yellowish phenomenon occurs in the area corresponding to the first region DRM-R.

Meanwhile, a bluish phenomenon is relatively reduced in the first region DRM-R. The diffusion reflection member DRM changes the wavelength incident thereto and the light having the changed wavelength is redirected towards the light conversion member 330. Therefore, although the light emitted from the light source is the blue light, the blue light may be prevented from being leaked from the first region DRM-R.

The light exiting through an area adjacent to the second region WS-R has the white color. The white reflective member maintains the wavelength of the light incident thereto, but scatters the light while reflecting the light incident thereto. Thus, the light incident to the white reflective member has the same color as that of the light reflected by the white reflective member. Since the blue light is incident to the light conversion member 330 while maintaining the blue color by the white reflective member, the blue light incident to the second region WS-R exits from the second region WS-R as the white color.

Meanwhile, a portion of the light may be leaked through between the white reflective member and the light guide plate by the scattering reflection. Therefore, the light leakage phenomenon may occur in the second region WS-R due to the high amount of the light.

Since the light causing the light leakage phenomenon does not transmit through the light conversion member 330, the light may have the blue color. Thus, the bluish phenomenon is relatively high in the second region WS-R compared with the first region DRM_R.

The light exiting through an area adjacent to the third region BS-R has a relatively dark color. The black reflective member absorbs the light incident thereto. Accordingly, the blue light is absorbed by the black reflective member and an amount of the light exiting through the area adjacent to the third region BS-R is reduced, and thus a relatively dark color appears.

The light exiting through an area adjacent to the fourth region 340-R has a relatively white color. When the fourth region 340-R is compared with a center portion of the light conversion member 330, a difference in color between the fourth region 340-R and the center portion of the light conversion member 330 substantially does not exist.

As described above, the reflective member 340 regularly reflects the light incident thereto. Therefore, the blue light incident to the reflective member 340 is reflected by the reflective member 340 and incident to the light conversion member 330 as the same blue color. Then, the white light exits from the light conversion member 330. Due to the regular reflection of the reflective member 340, most of the light incident to the reflective member 340 is redirected to the light guide plate 320, and thus the light leakage phenomenon, in which the light is leaked through between the light guide plate 320 and the reflective member 340, is reduced.

As described with reference to FIG. 6, the reflective member 340 regularly reflects the light incident thereto, so that the wavelength of the light incident to and reflected by the reflective member 340 is maintained and the light is prevented from being leaked. Accordingly, the display device provided with the reflective member 340 may improve the light leakage phenomenon, reduce the color difference, and improve the color reproducibility.

Figure 7:
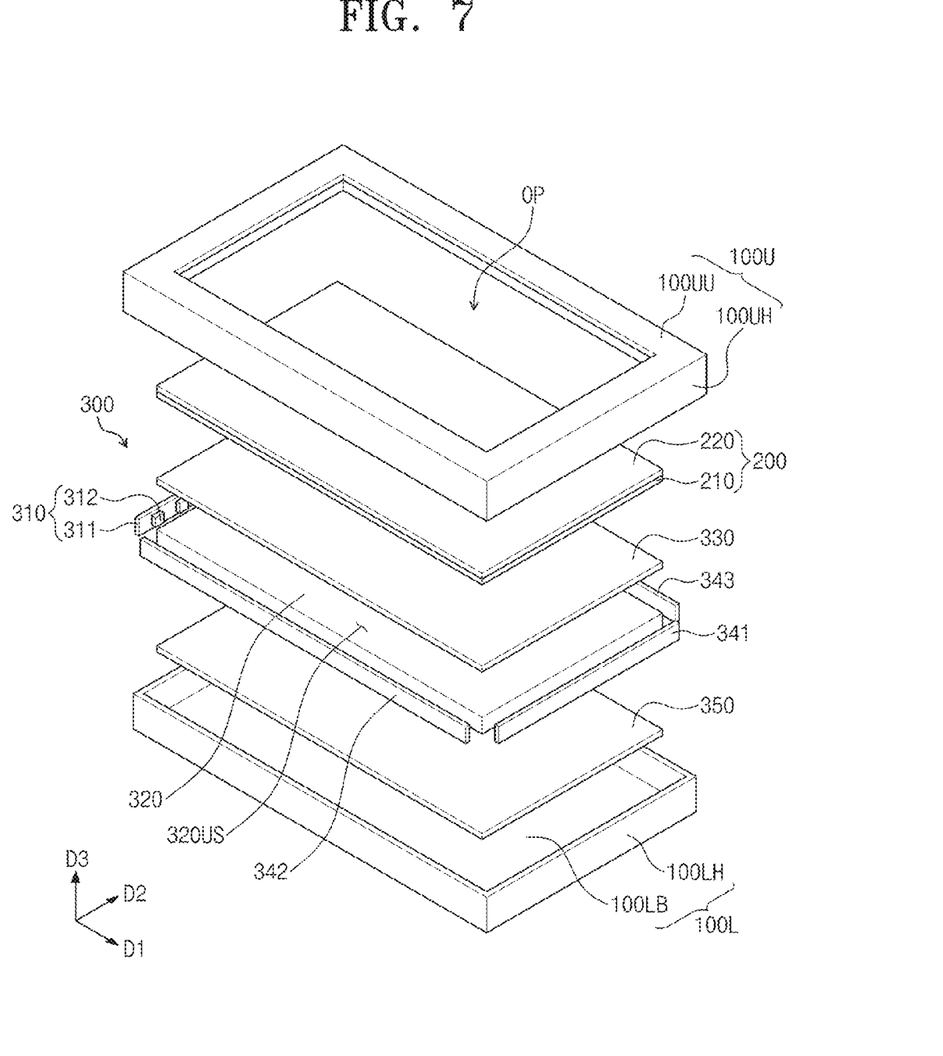
FIG. 7 is an exploded perspective view showing a display device according to an exemplary embodiment of the present disclosure.

FIG. 7 is an exploded perspective view showing a display device according to an exemplary embodiment of the present disclosure. The display device shown in FIG. 7 has the same structure and function as those of the display device shown in FIG. 1 except for the optical member 400, reflective members 341, 342, and 343, and a lower reflective sheet 350. For the convenience of explanation, the light guide pattern 320P (refer to FIG. 1) is not shown in FIG. 7. In FIG. 7, the same reference numerals denote the same elements in FIGS. 1 to 6, and thud detailed descriptions of the same elements will be omitted.

Referring to FIG. 7, the display device may further include the optical member 400. The optical member 400 improves the quality of the light exiting from the light conversion member 330.

The optical member 400 is configured to include a single film or plural films. For instance, the optical member 400 includes at least one of a prism film, a lens film, a dual brightness enhancement film, and a polarization film The display device includes the reflective members 341, 342, and 343 disposed in different areas. Each of the reflective members 341, 342, and 343 has substantially the same shape, structure, and function as those of the reflective member 340 shown in FIG. 1, and thus detailed descriptions of the reflective members 341, 342, and 343 will be omitted in order to avoid redundancy.

The reflective members 341, 342, and 343 are configured to include first, second, and third reflective members 341, 342, and 343. The first, second, and third reflective members 341, 342, and 343 are respectively disposed on the connection surfaces 320S2 to 320S4 among the connection surfaces 320S1 to 320S4 (refer to FIG. 1) except for the light incident surface 320S1 (refer to FIG. 1).

The first, second, and third reflective members 341, 342, and 343 regularly reflect the lights reaching the connection surfaces 320S2 to 320S4 to allow the lights to exit through the front surface 320US of the light guide plate 320. Accordingly, the display device may prevent the light leakage from occurring on the connection surfaces 320S2 to 320S4.

The lower reflective sheet 350 reflects the light reaching the rear surface (not shown) of the light guide plate 320 to allow the light to exit through the front surface 320US of the light guide plate 320. The light leakage in the rear surface may be smaller than that in the connection surfaces 320S2 to 320S4. Therefore, the lower reflective sheet 350 may be formed of various materials as long as the lower reflective sheet 350 changes only the path of the light incident thereto without changing the wavelength of the light incident thereto.

In general, the light leakage occurs at the edge of the light guide plate 320. This is because the path of the light traveling through the inside of the light guide plate 320 is irregularly changed at the edge of the light guide plate 320. The edge of the light guide plate 320 is formed by a cutting process when the light guide plate 320 is manufactured. In this case, the cut surface of the light guide plate 320 forms an irregular interface between outer and inner portions of the light guide plate 320, so that the light leakage easily occurs.

However, since the display device according to the present exemplary embodiment includes the reflective members 341, 342, and 343, the display device may prevent the light leakage from occurring at the edge of the backlight unit 300. The display device may have uniform color reproducibility over the entire surface of the display area. In addition, the display device uniformly provides the light to a bezel area thereof, and thus a narrow bezel may be realized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight unit, comprising:
a light source emitting a first color light;
a light guide plate comprising a light exit surface, a rear surface facing the light exiting surface, and a plurality of connection surfaces connecting the light exit surface and the rear surface, the connection surfaces comprising a first surface, a second surface facing the first surface, and third and fourth surfaces facing each other to connect the first and second surfaces, wherein the first surface faces the light source to receive the first color light and the first color light exits through the light exit surface;
a reflective member disposed on the second surface to specularly reflect a light reaching the second surface, wherein the light reaching the second surface corresponds to a portion of the first color light, the portion of the first color light is incident to the first surface and reaches the second surface;

a plurality of sub-reflective members respectively disposed on the third and fourth surfaces, the sub-reflective members specularly reflecting lights respectively reaching the third and fourth surfaces; and a light conversion member disposed on the light exit surface and overlapping the entire light exit surface, receiving the first color light from the light guide plate, and emitting a second color light different from the first color light, wherein a light incident to the reflective member has same wavelength after being reflected from the reflective member; and wherein the light conversion member comprises quantum dots dispersed to overlap the entire light exit surface.

2. The backlight unit of claim 1, wherein the light incident to the reflective member has substantially a same wavelength as a wavelength of the light reflected by the reflective member.

3. The backlight unit of claim 1, wherein the reflective member comprises a polymer material.

4. The backlight unit of claim 1, wherein the reflective member comprises a metal material.

5. The backlight unit of claim 1, wherein the second color light is a white light.

6. The backlight unit of claim 5, wherein the first color light is a blue light.

7. The backlight unit of claim 1, further comprising an adhesive member disposed on the second surface to couple the light guide plate and the reflective member.

8. The backlight unit of claim 7, wherein the adhesive member has a refractive index substantially equal to a refractive index of the light guide plate.

9. The backlight unit of claim 7, wherein the adhesive member is comprised of a polymer material, is optically colorless and transparent and is selected from a pressure sensitive adhesive, a thermal curable material and a photocurable material.

10. The backlight unit of claim 1, wherein the light guide plate further comprises reflective patterns disposed on the rear surface facing the light exit surface and the reflective patterns reflect a light reaching the rear surface.

11. The backlight unit of claim 1, wherein the reflective member comprises an enhanced specular reflector film.

12. A display device comprising:
a receiving unit;
a display panel accommodated in the receiving unit; and
a backlight unit accommodated in the receiving unit and disposed under the display panel to supply a first color light to the display panel, the backlight unit comprising:

a light source emitting a second color light different from a first color light;

a light guide plate comprising a light incident surface facing the light source to receive the second color light, a light exit surface bent from the light incident surface to face the display panel and emitting the second color light to the display panel, a rear surface opposite the light exit surface, and four connecting surfaces connecting the light exit surface and the rear surface, the connecting surfaces including a first connecting surface opposite a second connecting surface, and third and fourth connecting surfaces facing each other to connect the first and second connecting surfaces;

a reflective member disposed on a light facing surface facing the light incident surface to specularly reflect a light reaching the facing surface, and wherein the light reaching the facing surface corresponds to a portion of the second color light incident from the light incident surface;

a light conversion member disposed between the light guide plate and the display panel, overlapping the entire light exit surface, and receiving the second color light exiting through the light exit surface to provide the first color light to the display panel; and a plurality of sub-reflective members respectively disposed on the third and fourth connecting surfaces, the sub-reflective members specularly reflecting light respectively reaching the third and fourth connecting surfaces, and wherein a light incident to the reflective member has same wavelength after being reflected from the reflective member.

13. The display device of claim 12, wherein the light conversion member comprises a quantum dot.

14. The display device of claim 13, wherein the first color light is a white light.

15. The display device of claim 14, further comprising an optical member accommodated in the receiving unit and disposed between the light conversion member and the display panel.

16. The display device of claim 12, wherein the reflective member comprises a polymer material.

17. The display device of claim 12, wherein the reflective member comprises silver.

18. The display device of claim 12, wherein the reflective member covers an entire surface of the light facing surface.

* * * * *